United States Patent Office 2,939,653
Patented June 7, 1960

2,939,653
FLIGHT CONTROL SYSTEM

Arne P. Rasmussen, Millersville, Md., and Paul E. Seeley, Wellesley, Mass., assignors to Westinghouse Electric Corporation, East Pittsburgh, Pa., a corporation of Pennsylvania Filed Oct. 31, 1956, Ser. No. 619,549

16 Claims. (Cl. 244—78)

This invention relates generally to flight control systems and more particularly to a flight control system capable of operating the control means of a craft operable in space in response to manual or automatic commands.

For the purpose of illustration but without limitation this invention is illustrated in connection with the operation of a control surface of an aircraft, in particular the elevator. In regard to the control of a conventional aircraft the principles which are embodied in the control with respect to the pitch axis are also applicable in controlling the craft about the yaw or roll axes.

Present methods of superimposing automatic pilot damping or control displacement on the pilot manual controls usually embody a servo actuator which is placed in series in or differentially placed with the control linkage.

In a fluid operated arrangement, and with reference to a single axis, a servo actuator must supply a force to stroke a boost valve which controls a fluid actuator which drives the control surface. These forces must be reacted at some point. For the series or differential actuators this force is reacted against a spring loaded "feel" device in the manually controlled linkage of the system. In some cases this spring force is not sufficient to overpower the force due to boost valve friction, stroking force, damping and inertia. In any case when the stick is out of neutral position the boost valve load must be reacted in part by the human pilot.

It is therefore an object of this invention to provide a flight control system capable of autopilot manual control movement while at the same time guarding against over control by providing feedback control.

Another object of this invention is to provide an aircraft flight control system which is simple with respect to operational requirements and which is positive in operation.

Still another object of this invention is to provide an aircraft flight control system involving a power actuator for driving the control surface wherein the power actuator may be controlled by a pilot manual control or a suitable autopilot in which the control forces incident to the application of control intelligence to the power actuator are not reflected in the pilot's manual controls.

It is also an object of this invention to provide a flight control system of the character referred to, operable in automatic and manual control modes wherein provision is made for limiting control signals originating at the autopilot control during the automatic control mode of operation.

It is still another object of this invention to provide a control surface deflection responsive device for introducing a feedback damping control on the manual command control.

The foregoing statements are merely illustrative of the various aims and objects of this invention. Other objects and advantages will become apparent from the study of the following specification when considered in conjunction with the accompanying drawings, in which:

In practicing this invention the system provides the pilot's manual control with electrical pickoffs or pickups of any well-known type such as common potentiometers, the electrical outputs of which are applied to respective electrical control channels of the control system to control the respective control surface power actuators. In such an arrangement a control surface responsive potentiometer is usually employed to produce a control surface position signal which is applied in negative feedback sense with respect to a command potentiometer signal at the pilot's manual control to control the position of the power actuator with respect to the aircrafts air frame without over control. Thus, the pilot's manual control may cause a manual control surface deflection to establish an angular space rate of the aircraft with respect to a control axis, this control being damped by the autopilot space rate signals in the associated control channel.

A system of this type usually includes mechanical connections between the pilot's manual controls and the power actuator to provide direct manual control over the power actuator independently of the autopilot circuits. Under autopilot control with an added manual correction, as long as the two previously metnioned potentiometers track each other the manual control motion will stay within the dynamic capabilities of the servo system.

During autopilot control a boost valve is employed to control the application of fluid pressure to the power actuator. This boost valve is controlled by a servo actuator controlled by the output of the autopilot circuits and the boost valve is connected by a decoupling link with the pilot's manual controls. The decoupling is arranged to release the boost valve and servo actuator from the pilot's manual control during the autopilot mode of operation in an amount at least equal to the range necessary for adequate movement of the control surface. This means that the servo actuator will not affect the pilot's manual control.

This is a satisfactory arrangement if the error being corrected by the autopilot does not exceed the decoupling range of lost motion. When this lost motion range is exceeded by the servo actuator travel, the servo actuator, by reason of its connection with the manual controls, displaces the manual controls shifting the command potentiometer and hence introducing a false command signal. Since this command signal adds to the autopilot's signals this results in positive feedback in the system and the controls may be driven to their extreme limits. In some of the species included in this invention this action has been controlled through the use of a limiter in series with the command potentiometer and autopilot's control signals. In this way, the maximum control signal is limited to a value small enough to prevent positive feedback in the system.

Figure 1:
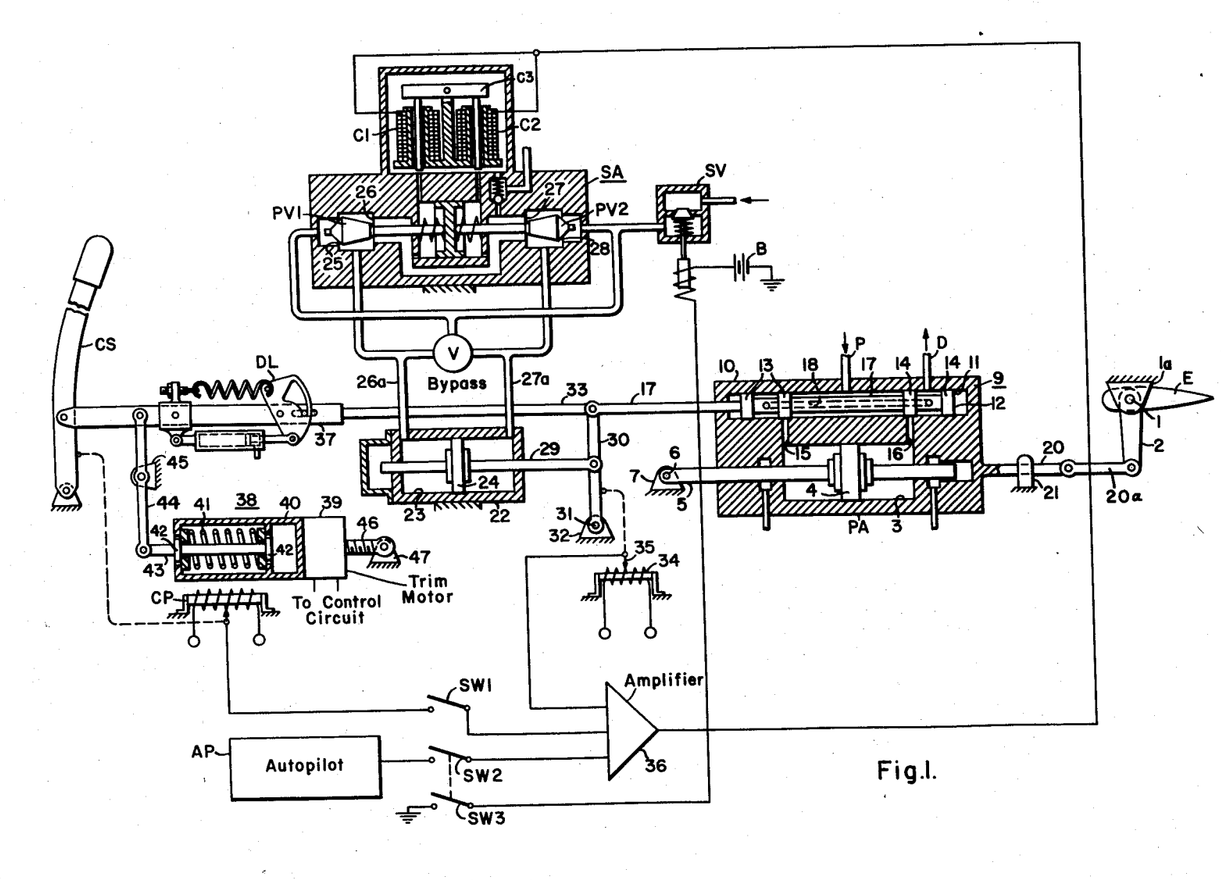
Figure 1 is a schematic view illustrating one embodiment of an aircraft flight control system embodying the principles of this invention.

In the embodiment of the invention illustrated in Fig. 1, a hydraulic power actuator PA is utilized to drive an elevator E of an aircraft (not shown). This elevator E is pivotally mounted by means of a torque tube 1 supported by the aircraft air frame bracket 1a. A specific pivotal mounting of the elevator is not shown in the interest of simplicity. A control horn 2, which is connected to the torque tube 1 provides a torque arm for elevator E applied forces causing rotation of the elevator about its pivot axis 1. The power actuator PA comprises a hydraulic cylinder 3 and a piston assembly generally designated as 4. The left end of the piston assembly represented in the piston rod 5 is pivotally secured by means of a pivot 6 to a stationary bracket 7 located on the air frame.

Provision is made for porting hydraulic fluid under pressure to and from the variable volume cavities in the power actuator housing on either side of the piston assembly 4 by means of a spool type control valve assembly generally designated 9. This control valve assembly comprises a housing 10 which is secured to or made a part of, the power actuator housing PA. The housing 10 is provided with an internal fluid porting cavity 11 in which a spool valve 12 is located. The spool valve 12 comprises the respective spools 13 and 14 which control the application of high pressure fluid into one or the other variable volume cavities on opposite sides of the power actuator piston 4, by connecting one or the other of a pair of fluid passages 15 or 16 communicating between the control valve housing and the ends of the variable volume cavities in the power actuator PA with a pressure inlet port P. The spools 13 and 14 are mounted upon a spool valve stem 17 which is provided with an axial cavity 18 which has radial openings adjacent the outer sides of the inner rings of the respective spools 13 and 14. Thus, the high pressure fluid which is admitted to the control valve cavity may be ported to the right side of the power actuator piston assembly by displacement of the spool valve stem 17 to the right as viewed. Fluid is then exhausted from the diminishing volume on the left side of the power actuator piston assembly 4 through the passage 15 into the volume in the spool valve on the left side of the inner ring of the spool 13. The fluid then passes through the axial passage 18 and is exhausted into the valve cavity on the right side of the inner ring of the spool 14, which communicates with the drain passage D.

In the interest of simplicity none of the piping details have been illustrated herein, it being understood that such arrangements may be of a conventional nature.

The power actuator PA connects with a rod 20 slidably mounted within a suitable stationary guide 21 and is pivotally connected to push rod 20a which in turn is pivotally connected to the outer end of the elevator horn 2 which completes the elevator control linkage.

The spool valve 12 may be controlled either by the autopilot system or the pilot's manual controls. The autopilot system is generally designated AP and again in the interest of simplicity such elements which are not of specific importance to the understanding of the invention have been illustrated only in block form and may involve conventional types of circuits such as shown in the C. R. Hanna Patent 2,638,288, patented May 12, 1953, assigned to the common assignee and entitled Control System for Craft Operable in Space. The pilot's manual control, in this particular case a single axis control system, is represented by a control stick CS. The control stick may control the control valve in two ways. First, it may be utilized to produce electrical command signals when it displaces a command potentiometer CP. The command signals may be fed through the autopilot circuits to effect a control over the control valve arrangement. Second, the control stick may exert direct mechanical forces on the control valve assembly through a decoupling linkage assembly generally designated DL.

The linkage decoupling assembly DL is a two position member which is described in greater detail in the copending application of Mark I. Place and Arne P. Rasmussen, Serial No. 530,934, filed August 29, 1955, now Patent No. 2,801,618, entitled Aircraft Control System and assigned to the assignee of this invention. It should be sufficient at this time to note that the decoupling link in one position directly connects the control stick CS to the control valve assembly 9 to transmit all of the stick movements to the control valve assembly. In its second position, however, the decoupling assembly introduces a degree of lost motion in this control stick linkage permitting the control valve assembly to be displaced independently of the control stick within the limits of the lost motion range. The purpose of this arrangement will be apparent hereinafter.

In autopilot control the output signals of the autopilot are converted to control valves stroking forces by means of a servo actuator generally designated SA. The servo actuator SA takes the form of an electromagnet controlled hydraulic bridge of the type similar to that disclosed in a co-pending application of C. R. Hanna, Serial No. 340,248, entitled Control Apparatus, and filed March 4, 1953, and assigned to the assignee of this invention. The details of this servo actuator will not be explained in this application as they are completely shown and described in the previously disclosed Hanna application. Briefly however, the servo actuator SA is provided with a housing 22 secured to the air frame of the vehicle. The housing 22 is provided with a cylinder 23 and an associated piston 24. Fluid pressure control of the piston 24 within the cylinder 23 is accomplished by a first stage hydraulic bridge controlled by a pair of electromagnets C1 and C2. The electromagnets C1 and C2 control an armature C3 which is pivoted for rotation about a center point to control a pair of valves PV1 and PV2 as explained hereinafter. If the armature C3 is rotated clockwise in response to electromagnet control, the valve PV1 would move to a position restricting the incoming fluid flow through the pressure port 25 while at the same time relieving the outgoing pressure port 26, thus allowing the release of fluid pressure within the chamber formed by the cylinder 23 and piston 24 to the left of the piston 24 as viewed in the drawings through the pipe 26a. At the same time, the valve PV2 will move to a position restricting the outgoing port 27 and opening the pressure port 28 allowing the introduction of greater fluid flow into the chamber formed by the cylinder 23 and piston 24 to the right of the piston as viewed in the drawings through the pipe 27a. Under these conditions, the piston 24 would travel to the left, as viewed in the drawings, until the armature C3 is again neutralized or until the piston reaches the extreme left position. It should be clear that if counterclockwise rotation of the armature should take place, the opposite result would take place causing the piston to move to the right.

The pipes 26a and 27a, interconnecting the control valves PV1 and PV2 with the servo actuator piston 24, are provided with a by-pass valve V of any suitable type which is controlled to be closed when the pressure supply is introduced into the control valves PV1 and PV2 and opened when the pressure supply is removed from the control valves PV1 and PV2. The supply pressure is applied or removed by a solenoid controlled valve SV, of any suitable well-known type, but shown here as being biased to closed position and opened by an obvious circuit energized by closure of the switch SW3 completing the circuit for the solenoid of the valve SV through a source battery B.

The piston 24 is provided with a piston rod 29 pivotally connected to an actuating link 30 having one end pivoted as at 31 to a stationary bracket 32. The opposite end of the control link 30 is then pivotally connected to the boost valve spool assembly valve stem 17 and to the manually controlled link 33 associated with the disconnect device DL. It can be seen, therefore, that displacement of the servo actuator SA piston 24 results in a proportional displacement of the control valve stem and valve assembly 12 causing a corresponding proportional displacement of the power actuator PA with respect to its piston 4. The power actuator then causes a displacement in the control surface elevator E. It should be noted that all of the operating forces, instead of being reflected into the manually controlled means, are acting against fixed points on the air frame. From this, it can be seen that no control forces will be felt in the manual control due to servo actuator SA operation.

Associated with the control valve control link 30 is a control valve displacement responsive potentiometer 34, which is firmly secured to the air frame of the aircraft with a variable tap 35 connected to the link 30 for physical displacement in response to link movement. The variable tap 35 of the potentiometer 34 is electrically connected through a conventional mixer and amplifier 36 to control the control magnets C1 and C2 of the servo actuator SA. In addition, signals from previously mentioned autopilot circuit AP and control potentiometer CP are selectively introduced into the amplifier and mixer 36 for the control of the magnets C1 and C2 by the switches SW1 and SW2.

The command potentiometer signal when present is used to control the servo actuator causing a corresponding displacement in the servo actuator piston. The control surface following potentiometer 34 signal however is fed into the amplifier in a negative sense causing a decrease in the signal of the command potentiometer. This differential signal introduced by the control surface responsive potentiometer 34 provides stabilization of any control commands, providing proper control without over control.

The control stick CS is provided with a control link 37 cooperating with the control link 33 through the interconnection of the disconnect device DL. Since the pilot of a vehicle having this system in displacing the control stick CS would feel only the pressures necessary to actuate the hydraulic system, which may be relatively small compared to the control surface pressures that would be encountered under direct control of the elevator E, the control link 37 is provided with a control feel device generally designated 38 for providing pilot control feel pressures. The control feel device 38 also includes a trim motor 39 for maintaining the aircraft control stick CS in its neutral position during stable flight conditions. The feel device 38 is provided with a housing 40 enclosing a biasing spring 41 retained between the ends of a double ended piston 42 supported on a piston rod 43 pivotally connected to a drive link 44 supported on an air frame mounted pivot bracket 45 and also pivotally connected to the control link 37 of the control stick CS. Since the bias spring 41 is retained between the ends of the double ended piston 42, it is placed under an initial bias pressure so that movement of the piston in either direction is resisted by an initial bias equal to the bias spring compression.

The trim motor 39 is positioned within the trim device housing 40 and cooperates with a threaded shaft 46 pivotally connected to an air frame support bracket 47. Energization of the trim motor 39 causes the trim motor to travel along the threaded member 46 and therefore displace the housing 40 of the trim device 38 resulting in a displacement of the control stick CS.

Operation of the device will now be described under each of its three control conditions, the first being under autopilot control without the introduction of manual signals. Under these conditions the disconnect device DL is positioned to introduce lost motion between the control link 37 and the control link 33 and the autopilot AP in response to its position and/or rate gyros (not shown) is introducing into the amplifier 36 control impulses which are then amplified and delivered to the control magnets C1 and C2. The control magnets C1 and C2 in response to the control impulses then causes the piston 24 of the servo actuator SA to be displaced one way or the other and in turn pivot the link 30 about its pivot point on the bracket 31 driving the boost valve piston assembly 12 one direction or the other and in turn introducing fluid pressure to one side or the other of the power actuator piston 4 causing a resultant displacement of the elevator surface E. The displacement of the link 30 also causes displacement of the variable tap 55 on the control surface responsive potentiometer 34 which in turn introduces a differential signal into the amplifier 36 tending to reduce the autopilot control signal and thus obtain stability of the control signal and control surface displacement.

The second control condition is when the command potentiometer CP is providing control signals during the introduction of autopilot signals. Under these conditions the command potentiometer CP introduces an additional signal into the amplifier 36 causing the control valve 9 and power actuator PA to be displaced an additional amount in response to command potentiometer CP signals. Control surface displacement signals from the potentiometer 34 are still negatively fed into the mixer amplifier 36 causing neutralization of the command potentiometer CP and autopilot signals when the control surface displacement is the same as that requested by the autopilot and command potentiometer.

The third operating condition capable of being set up is one in which the disconnect device DL is in its other position causing the link 37 to be directly coupled to the link 33, and the switches SW1, SW2 and SW3 are opened. Under these conditions the control stick movement would be directly delivered to the spool valve assembly 12 of the control valve 9 causing a direct displacement of the spool valve assembly 12 and an input flow of fluid to the power actuator PA and thus movement of the control surface E. At the same time, the command potentiometer is disconnected by the switch SW1 and the autopilot signals are interrupted by the opening of the switch SW2. It is also necessary to remove the servo actuator from control action. This is accomplished by opening the switch SW3 which deenergizes the solenoid valve SV removing supply pressure from the servo actuator SA and opening the bypass valve V.

It is pointed out at this time that under conditions of control of the system by command potentiometer CP with the decoupling device DL in lost-motion position and with autopilot signals being introduced, an autopilot control signal of a magnitude sufficiently great to exceed the limits of the disconnect lost-motion device may cause an actual physical displacement of the control stick CS. When this occurs a greater signal is introduced by the command potentiometer CP which is added to the control signals of the autopilot and of such magnitude to cause an even greater total signal to be introduced to the servo actuator and power actuator. Under these conditions the system may become unstable causing full control movement to the limits of its travel. Under certain circumstances this condition becomes undesirable. For this reason the embodiments found in the remaining Figures 2 through 6 provide a means for eliminating this function.

Figure 2:
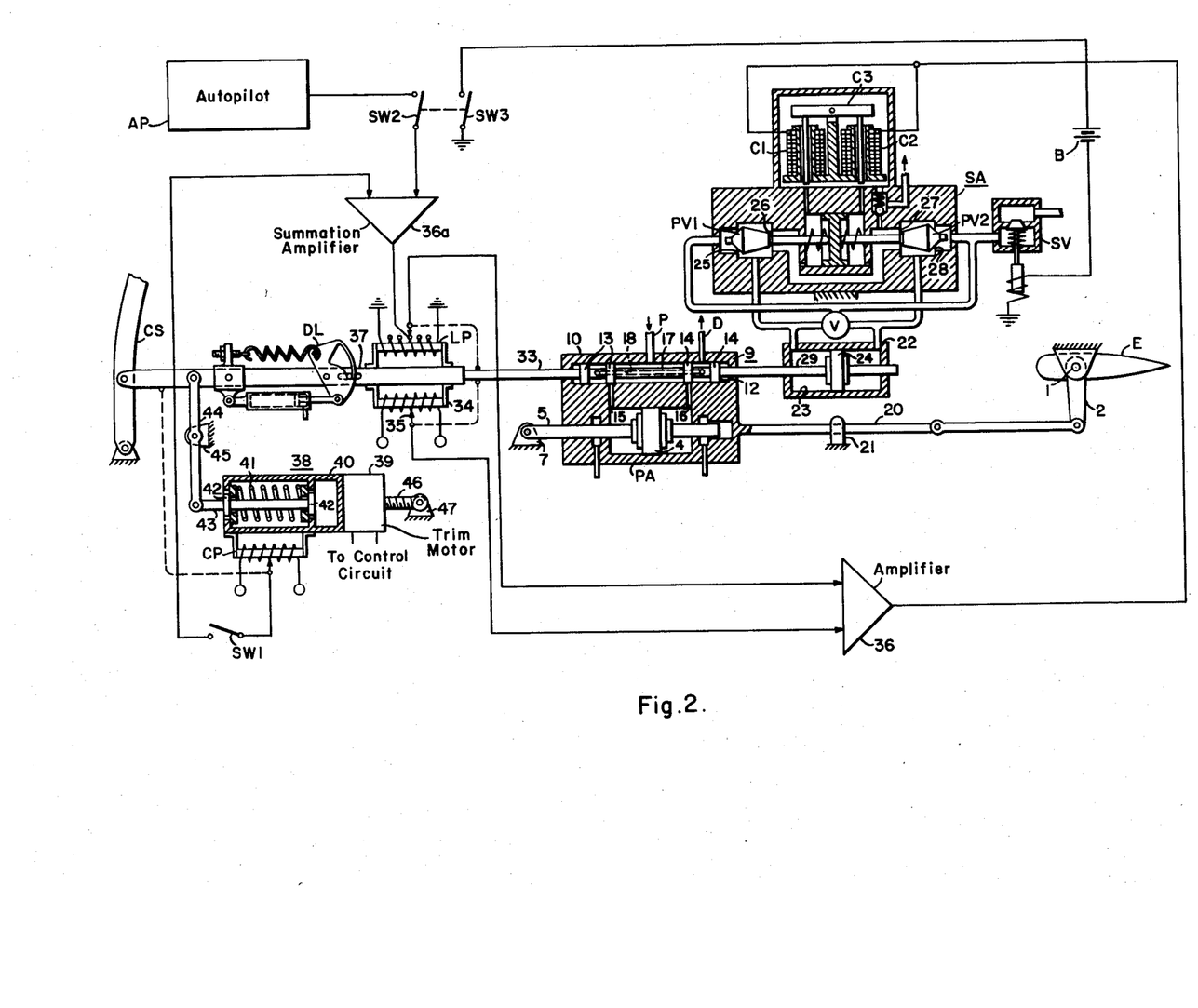
Fig. 2 is a schematic view illustrating a second embodiment of this invention.

In the embodiment of the invention illustrated in Fig. 2, components corresponding to those illustrated in Fig. 1 bear like reference characters. This system is generally the same as that illustrated in Fig. 1 except for the introduction of an autopilot control signal limiter LP, the repositioning of the control surface following potentiometer 34 and the relocation of the servo actuator SA to a position of direct control on the control valve piston assembly 12.

With the servo actuator piston 24 connected directly to the control valve piston assembly 12 a one-to-one ratio of servo actuator piston 24 displacement to control valve piston assembly 12 displacement occurs rather than a proportional movement, as in the case of Fig. 1. With the repositioning of the control surface potentiometer 34 to a position in which one member (the variable tap 35) is connected to control surface following linkage 33 while the other member (the resistance of the potentiometer) is connected to control stick attached linkage 37, it can be seen that the potentiometer 34 will vary in direct relation to control surface movement with respect to control stick position. It is to be understood that this action takes place only when the decoupling link is moved to the position providing lost motion in the control stick to control valve linkage. This occurs during the time that the autopilot is in control of the aircraft control surface.

Mechanically connected between the control stick linkage and the elevator surface control linkage is an autopilot signal limiter LP. As shown in this figure this limiter LP is a variable potentiometer. However, other forms could be taken. Operation of the system during autopilot control with the use of the limiter is explained as follows: Over a small range of displacements on either side of center the limiting potentiometer LP has little or no effect with respect to signal limiting since there is little or no change in the inserted resistance in the autopilot to amplifier signal line. Thus, any signal passing through a summation amplifier 36a, limiter LP, signal amplifier 36 and arriving at the servo actuator SA which is of autopilot origin is not limited or clipped. However, in aircraft control, for example systems such as radar tracking or in connection with servo air disturbances which may suddenly cause air frame displacements, it may be desirable (particularly in high speed aircraft) to limit the signal level which may be applied to the servo actuator so that air frame loadings may never exceed the design limit load factor. In the event that such displacement of control surface should occur, the decoupling link DL lost motion would be exceeded and the control stick linkage would be dragged along with the power actuator displacement. In this situation the command potentiometer CP associated with the control stick linkage would be displaced and thus would apply a signal to the autopilot circuits. With the introduction of the limiter the autopilot and command potentiometer CP introduced signal would be effectively limited by the limiting potentiometer LP to make the combined signal fall within the limits of the decoupling member lost motion displacement. The combined signal being applied to the servo actuator would therefore be limited to aircraft load factor limits.

Figure 3:
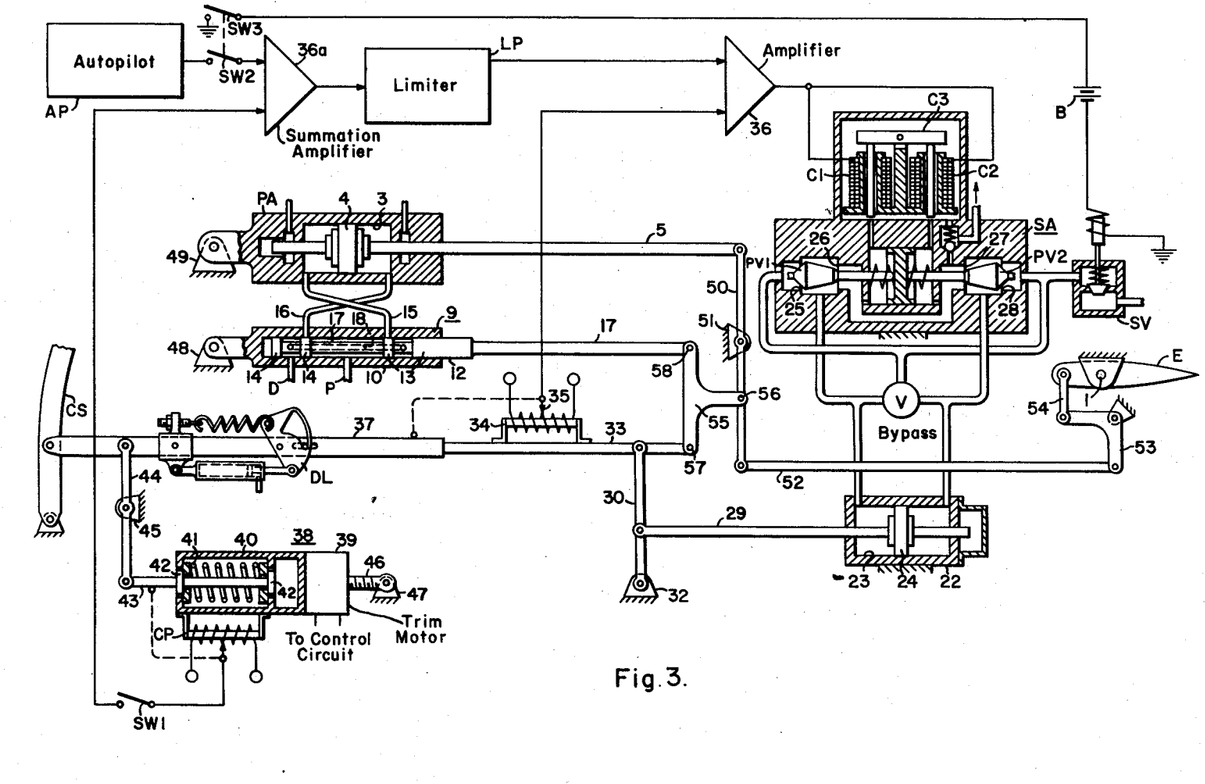
Fig. 3 is a schematic view illustrating another embodiment of this invention utilizing modified control linkage.

The embodiment of the invention disclosed by Fig. 3 is similar to that of Fig. 2 with similarly illustrated parts bearing like reference characters. The difference between the two figures is the different control linkage arrangement of the various hydraulic components to obtain certain advantages with regard to the length of stroke of the servo actuator and the addition of a mechanical advantage provided to the power actuator. In this embodiment of the invention the power actuator PA and the control valve assembly are separate assemblies, the control valve assembly now being connected to a fixed point on the air frame by means of a bracket 48 to which it is pivotally connected at one end. In other respects the control valve corresponds to that illustrated in Fig. 2. Additionally, in Fig. 3 the power actuator PA has its housing pivotally connected to a fixed bracket 49 and the piston assembly now drives the control surface linkage. The control surface linkage comprises a pivotally mounted link 50 connected to a fixed pivot 51 on the air frame. This link is driven by the piston rod 5 and is provided with a drive linkage 52 at its lower end connected to a bell crank 53 which in turn is connected by a drive link 54 to the elevator E to effect pivoting of the elevator about its axis 1. An actuator link 55 is pivoted at 56 to the link 50 between its pivot mounting at 51 and its lower end. Thus, the actuator link pivot 56 is displaced as the control surface is displaced by the power actuator piston assembly. The control stick linkage 33 is pivotally connected to the actuator link 55 at the pivot point 57 at a point one side of the actuator link 55 pivot support 56 while the control valve piston rod 17 is pivotally connected to the actuator link 55 at the point 58 located on the opposite side of actuator link 55 pivot point 56.

The servo actuator SA like that of Fig. 1 is secured to the air frame along its housing while its piston rod 29 is connected to a link pivotally secured at one end to the actuating link 33 and at its other end to an air frame supported bracket 32. It will be appreciated that this physical configuration corresponds functionally to that described in Fig. 2 with the exception that the follow-up control afforded by the "piggy-back" mounting of the control valve in Fig. 1 is now achieved by the actuator link 55 which is driven by the control link 33. For example, in the power control mode of operation with the decoupling link locked in position, displacement of the control stick CS affects counterclockwise rotation of the link 55 about its pivot 56 which is now fixed by reason of the immobility of the power actuator PA piston assembly 4. The point 58 now has a component of displacement to the left as viewed in the drawing displacing the control valve to the left. This ports high pressure fluid to the right side of the power actuator piston assembly 4 with this assembly moving to the left and rotating the control link 50 counterclockwise. This motion is transferred through the bell crank 52 to the elevator E displacing the elevator and corresponding mount.

Except for different control linkage mechanical advantage operation of this species is the same as that of Fig. 2.

Figure 4:
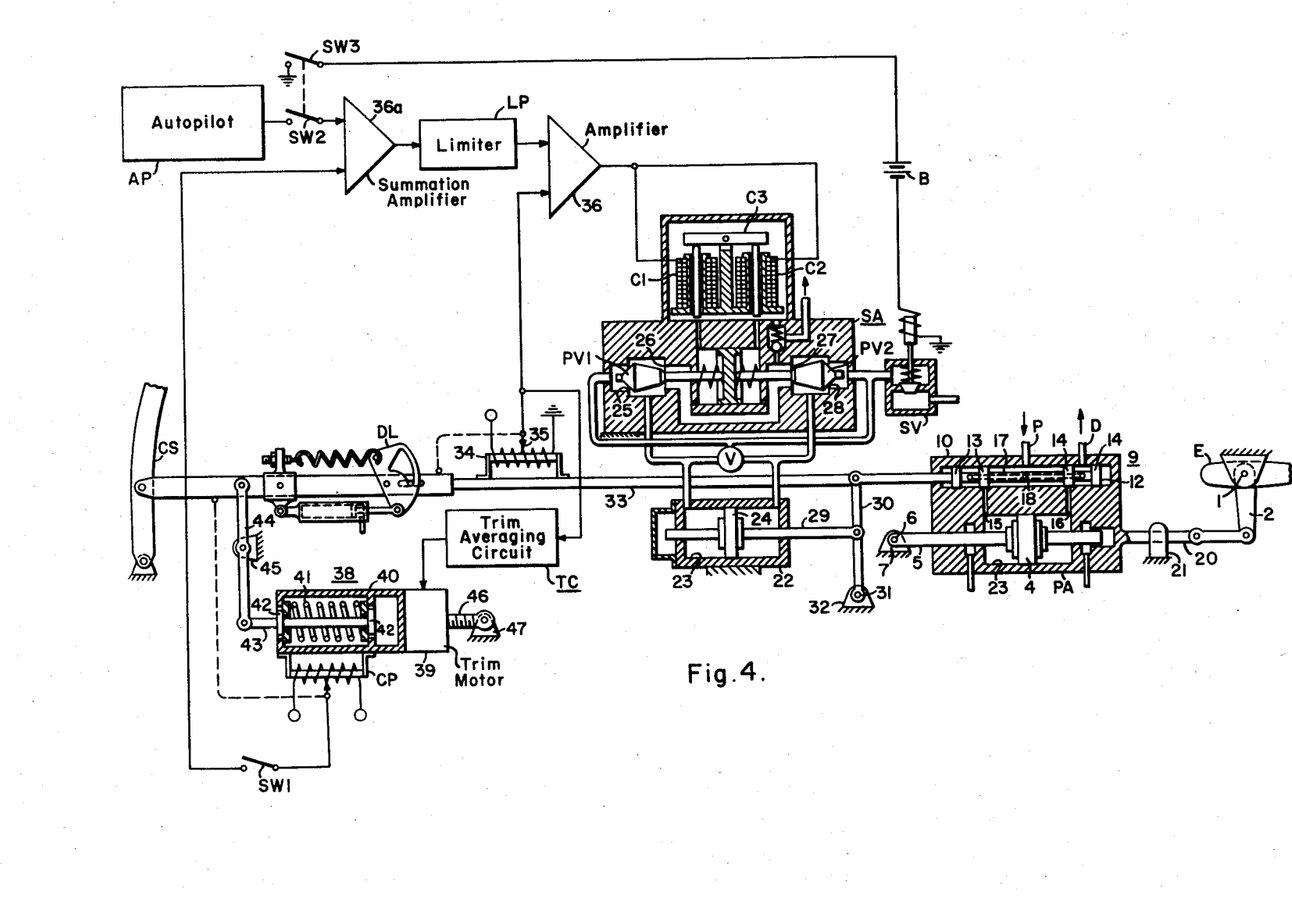
Fig. 4 is a schematic view illustrating still another embodiment of this invention having a modified servo valve control.

In the embodiment of Fig. 4, similar parts are designated by similar reference characters to those found in the species shown in Fig. 2. This embodiment is similar to that of Fig. 2 with the exception of the introduction of a trim motor circuit TC (shown in detail in Fig. 5) for automatically controlling the trim motor in response to an average continuous displacement of the control surface E. This embodiment additionally uses a servo actuator connected to the control link 33 in a manner similar to Fig. 1. That is, through a pivoted control link 30.

Operation of this species is the same as that described in connection with Fig. 2 with the exception that a constant average displacement of the control surface E from its normal center position is detected by the trim average circuit and used to control the trim motor for recentering the control stick to the average stable control surface positions.

Figure 5:
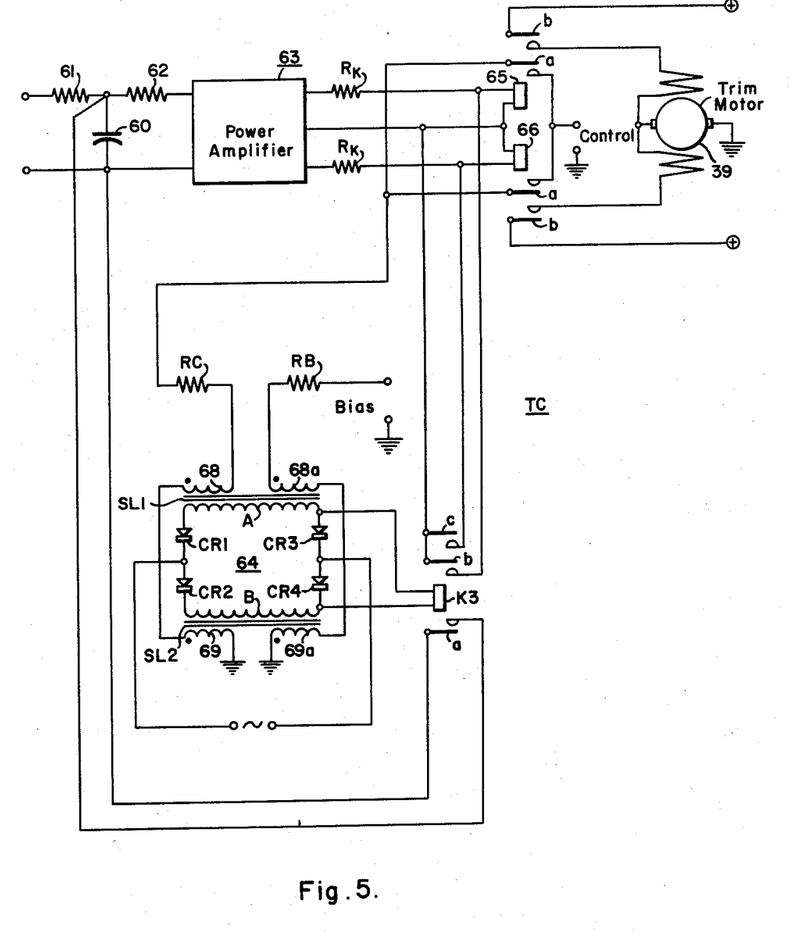
Fig. 5 is a schematic view of a typical control circuit for a control linkage trim motor.

The trim average circuit may take any suitable typical form such as that shown in Fig. 5 utilizing a capacitor 60 and resistors 61 and 62 forming an integrating network, the potential of which is applied to a pair of magnetic amplifier devices 63 and 64. The magnetic amplifier device 63 of the trim averaging circuit TC is responsive to the integrating network formed by the components 60, 61 and 62 to selectively apply voltages through current limiting resistors $R_k$ to a pair of relays 65 and 66 in response to control voltages applied to the integrating network in one direction or the other. Relays 65 and 66 each have a contact a connected to a control voltage source, not shown, and through a limiting resistor RC and control windings 68 and 69 of the saturable reactor cores SL1 and SL2 of the magnetic amplifier 64. The contacts a of the relays 65 and 66 are normally open contacts and are connected in parallel so that the energization of either relay 65 or 66 completes the control voltage circuit for the magnetic amplifier device 64.

The saturable reactor cores SL1 and SL2 of the magnetic amplifier device 64 are provided with bias windings 68a and 69a connected through a current limiting resistor RB to a bias source, not shown, and biasing the magnetic amplifier device to cutoff. Mutually coupled to the windings 68 and 68a is a secondary winding A which is associated with the saturable reactor core SL1. Likewise, a winding B of the saturable reactor core SL2 is mutually coupled to the windings 69 and 69a. The magnetic amplifier device 64 is energized from an alternating-current source, not shown, connected to the windings A and B of the saturable cores SL1 and SL2 through suitable current directing rectifiers CR1, CR2, CR3 and CR4. Connected between a point on the winding A adjacent the rectifier CR3 and a point on the winding B adjacent the rectifier CR4 is a relay K3. The relay K3 is provided with three sets of normally open contacts a, b and c with the contact a acting when closed to remove the charge from the capacitor 60 and the relay contacts b and c acting to shunt the relays 65 and 66 to assure deenergization of these relays.

The magnetic amplifier device 64 is provided with a delay characteristic typical of magnetic amplifier devices. In addition, the magnetic amplifier device 64 is provided with a bias voltage supplied to the windings 68 and 69a capable of biasing the magnetic amplifier device to cutoff.

Operation of the circuit will now be described. If we assume a voltage of one polarity is supplied to the integrating network comprising the elements 60, 61 and 62, this energy is applied to the magnetic amplifier device 63 to selectively energize one of the relays 65 or 66. For the purpose of this description, we will assume that relay 65 has become energized due to the integrating network energy. Relay 65, upon becoming energized, closes its contacts a and b. The contact b, in turn, closes an energizing circuit for the trim motor 39 causing it to rotate in one direction. At the same time, the contact a of the relay 65 becomes closed supplying the magntic amplifier device 64 with a control voltage. The control voltage supplied to the magnetic amplifier 64 changes the bias level of the magnetic amplifier device to bring it above cut-off bias level, supplied by the windings 68a and 69a. When this occurs, conduction of the magamp device takes place and with the device constructed to provide a long time delay before an appreciable output occurs. The relay K3 will remain deenergized until the time delay period has expired and the output current rises sufficiently to energize the relay. At the end of the time period, resulting in the energization of the relay K3, its contacts a, b and c become closed. The contact a shunts the capacitor 60 removing all charge from this capacitor. The contacts b and c also assure the deenergization of the relays 65 and 66 and in turn the deenergization of the trim motor 39. The trim circuit is once again ready for another cycle. The following cycle may drive the trim motor 39 in the same direction as the one just described or may drive it in the reverse direction causing opposite aircraft trim.

Figure 6:
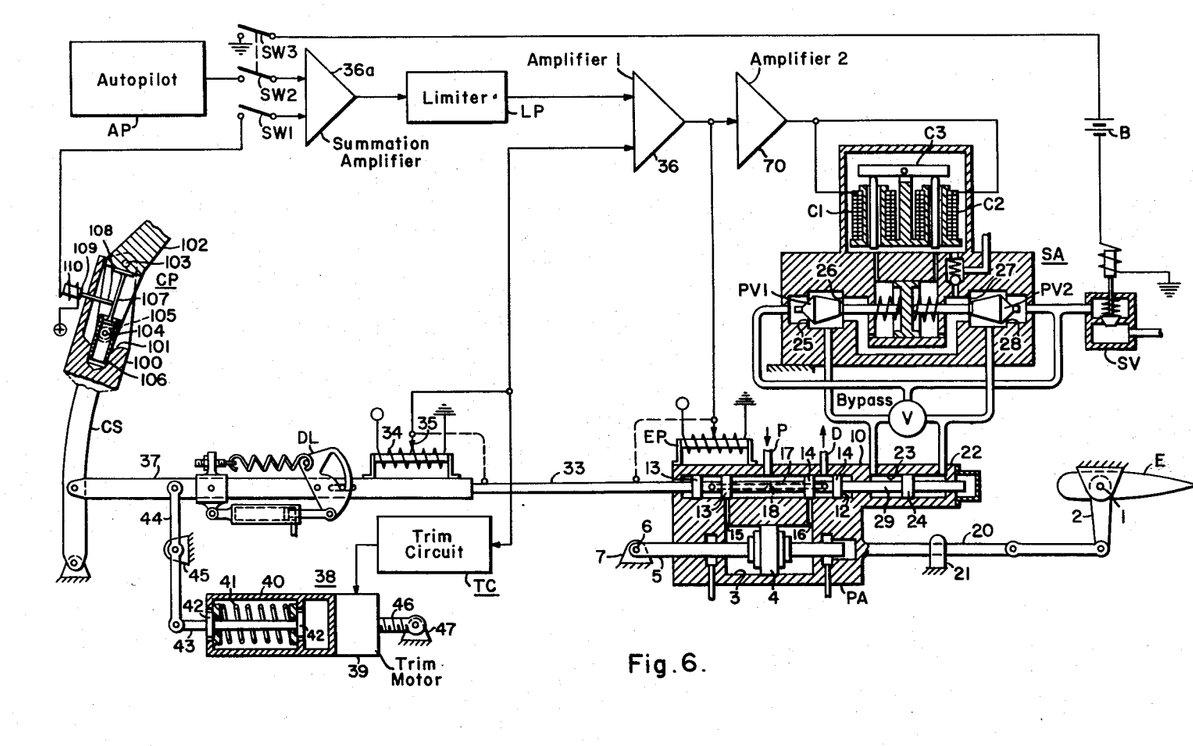
Fig. 6 is a schematic view illustrating still another embodiment of this invention providing a modified feedback control.

In the embodiment shown in Fig. 6 components corresponding to those illustrated in Fig. 4 bear like reference characters. This system is generally the same as that illustrated in Fig. 4 with the exception that the servo actuator is formed as an integral part of the power actuator movable portion with its piston directly connected to the control valve piston assembly. In addition, there is included a control valve position variable potentiometer EP for providing an additional differential or velocity feedback signal to prevent over control. Also, in addition to the amplifier 36 a second amplifier 70 is provided to increase the effectiveness of the servo actuator control. The differential control signal initiated by the control potentiometer EP, in response to control surface displacement initiated by the autopilot, is inserted into the circuit between the amplifier 36 and the amplifier 70. This differential signal cancels the output of the amplifier 36 stabilizing the servo actuator SA. The initial autopilot signal input to the amplifier 36 is then cancelled by the control surface responsive potentiometer 34 in a manner similar to that explained in connection with the previous figures illustrated by the Figs. 2 through 4. The system then becomes stable at the autopilot selected control signal level.

The control potentiometer CP shown in each of the Figs. 1 through 4 is replaced in Fig. 6 by a control stick CS located variable reluctance control device CD.

The control device CD comprises an enlarged base portion 100 on the control stick CS having a central cavity 101. Pivoted to the upper end of the enlarged base portion 100 and extending into the cavity 101 is the upper portion 102 of the control stick CS. The upper portion 102 is pivoted about the pivot 103 and is limited in the pivot motion by a pin 104 passing through an enlarged opening 105 in the extended cavity received end of the upper portion 102.

Secured to the base 100 in the lower end of the cavity 101 is a tube 106. The tube 106 receives the unsecured end of a cantilever member 107 which is secured to the upper portion 102 of the control stick CS at a point adjacent the pivot 103.

Associated with the cantilever member 107 at a point between the ends of the member is an actuating rod 108 having an enlarged end 109. The enlarged end 109 has a coil 110 surrounding it which is connected between a source of power terminal and the summation amplifier 36a through a switch SW1.

Operation of the control device is as follows. Upon the application of manual pressure on the upper portion 102 of the control stick CS the cantilever members 107 becomes bowed causing a displacement of the actuating rod 108 and its enlarged end 109. The deflection of the cantilever member 107 is proportioned to the manual force applied up to the limit of the allowable pivot angle set by the space of the opening 105. Movement of the enlarged actuating rod end 109 causes a variation in the reluctance of the coil 110 with the change affecting the control of the summation amplifier 36a. Otherwise, the operation of this system may be understood from the discussion relating to Fig. 4 as previously recited.

Although five embodiments of this invention have been illustrated herein it will be appreciated by those skilled in the art that this invention both as to its details and as to its organization may be modified without departing from the spirit and scope of the invention. This invention is intended to be limited only by the scope of the appended claims.

We claim as our invention:

1. A control system for space vehicles comprising a power actuator having a stationary portion and a movable portion, a control device connected to said movable portion, a control valve for said power actuator, manual means including a control link for at times controlling said control valve for operating said power actuator, a servo actuator connected to said control valve for at other times controlling said control valve, electrically controlled valve means for controlling said servo actuator, a disconnect means in said control link for at other times disconnecting said manual means from said control valve, control valve following means for introducing a control signal into said electrically controlled valve means upon control valve displacement, manual means follower for introducing a second control signal into said electrically controlled valve in response to manual means movement, and automatic control means for introducing a third signal into said electrically controlled valve during said other times.

2. A control system for a movable flight control surface of a space vehicle comprising, a fluid power actuator having a stationary portion and a movable portion, said movable portion being connected to said movable surface, a control fluid valve for controlling said power actuator, manual control means including a control link for at times controlling said control valve, a servo actuator for at other times controlling said control valve, a disconnect means in said control link for at other times disconnecting said manual means from said control valve, a control valve position responsive means for controlling said servo actuator, manual means controller device for additionally controlling said servo actuator, and autopilot control means for also controlling said control valve during said other times.

3. A control system for a movable flight control surface of a space vehicle comprising, a fluid power actuator having a stationary portion and a movable portion, said movable portion being connected to said movable surface, a control fluid valve for controlling said power actuator, manual control means including a control link for at times controlling said control valve, a servo actuator for at other times controlling said control valve, a disconnect means in said control link for at other times disconnecting said manual means from said control valve, control valve position responsive means for controlling said servo actuator, manual means controller device for additionally controlling said servo actuator, and autopilot control means for also controlling said servo actuator during said other times, said control valve having one portion integral with said power actuator and a second portion integral with said control link.

4. A control system for a movable flight control surface of a space vehicle comprising, a fluid power actuator having a stationary portion and a movable portion, said movable portion being connected to said movable surface, a control fluid valve for controlling said power actuator, manual control means including a control link for at times controlling said control valve, a servo actuator for at other times controlling said control valve, a disconnect means in said control link for at other times disconnecting said manual means from said control valve, control valve position responsive means for controlling said servo actuator, manual means controller device for additionally controlling said servo actuator, autopilot control means for also controlling said servo actuator during said other times, and switch means for selectively removing said manual controller device from control of said servo actuator during said times.

5. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during said times, and autopilot means for at said times causing said servo actuator to actuate said control valve, said servo actuator means comprising a first stage electrically controlled hydraulic bridge, said control means comprising electrical means for comparing control valve to manual means position to control said electrically controlled hydraulic bridge.

6. A control system for space vehicles comprising a power actuator having a stationary portion and a movable portion, said power actuator movable portion being connected to a control device, a control valve for said power actuator, manual means including a control link for at times controlling said control valve for operating said power actuator, a servo actuator connected to said control valve for at other times controlling said control valve, electrically controlled valve means input in said servo actuator, a disconnect means in said control link for at other times disconnecting said manual means from said control valve, control device following means for introducing a control signal into said electrically controlled valve upon control device displacement, manual means follower for introducing a second control signal into said electrically controlled valve in response to manual means movement, and automatic control means for introducing a third signal into said electrically controlled valve during said other times, and limiter means in said automatic control means and said manual means follower for limiting control signals to a level below any unstable limits of the fluid system.

7. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during other times, and autopilot means for at said other times causing said servo actuator to actuate said control valve, said servo actuator means comprising a first stage electrically controlled hydraulic bridge, said control means bridging said link disconnect means for producing an output indicating relative control valve displacement to manual control position.

8. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during said times, and autopilot means for at said times causing said servo actuator to actuate said control valve; said servo actuator means comprising a first stage electrically controlled hydraulic bridge, said control means bridging said link disconnect means for producing an output indicating relative control valve displacement to manual control position, said control means output at said times being combined with an output from said autopilot means for controlling said power actuator and control surface.

9. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during said times, and autopilot means for at said times causing said servo actuator to actuate said control valve; said servo actuator means comprising a first stage electrically controlled hydraulic bridge, said control means bridging said link disconnect means for producing an output indicating relative control valve displacement to manual control position, said control means output at said times being combined with an output from said autopilot means for controlling said power actuator and control surface, and limiter means in said autopilot means for limiting said combined outputs to prevent over control of said control surface.

10. A control system for a movable flight control surface of a space vehicle comprising, a fluid power actuator having a stationary portion and a movable portion, said movable portion being connected to said movable surface, a control fluid valve for controlling said power actuator, manual control means including a control link for at times controlling said control valve, a servo actuator for at other times controlling said boost valve, a disconnect means in said control link for at other times disconnecting said manual means from said control valve, control valve position response means for controlling said servo actuator, manual means controller device for additionally controlling said servo actuator, and autopilot control means for also controlling said servo actuator during said other times, limiter means in said autopilot control means, a first and second amplifier connected in series between said limiter and said servo actuator for amplifying all servo actuator applied controls.

11. A control system for a movable flight control surface of a space vehicle comprising, a fluid power actuator having a stationary portion and a movable portion, said movable portion being connected to said movable surface, a control fluid valve for controlling said power actuator, manual control means including a control link for at times controlling said control valve, a servo actuator for at other times controlling said control valve, a disconnect means in said control link for at other times disconnecting said manual means from said control valve, control valve position response means for controlling said servo actuator, manual means controller device for additionally controlling said servo actuator, and autopilot control means for also controlling said servo actuator during said other times; limiter means in said autopilot control means, a first and second amplifier connected in series between said limiter and said servo actuator for amplifying all servo actuator applied controls, said control valve position response means having an output introduced into said second amplifier only to act as a neutralizing control, said manual means controller device comprising a force measuring spring and a spring connected variable reluctance coil.

12. A control system for a movable flight control surface of a space vehicle comprising, a fluid power actuator having a stationary portion and a movable portion, said movable portion being connected to said movable surface, a control fluid valve for controlling said power actuator, manual control means including a control link for at times controlling said control valve, a servo actuator for at other times controlling said control valve, a disconnect means in said control link for at said other times disconnecting said manual means from said control valve, control valve response means for controlling said servo actuator, manual means controller device for additionally controlling said servo actuator, and autopilot control means for also controlling said servo actuator during said other times, said power actuator, said control valve and said servo actuator being separate members interconnected through additional control linkage.

13. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during said times, and autopilot means for at said times causing said servo actuator to actuate said control valve, said servo actuator means comprising a first stage electrically controlled hydraulic bridge, said control means bridging said link disconnect means for producing an output indicating relative control valve displacement to manual control position, and trim means responsive to said control means for resetting said manual means to maintain neutral means position during stable control surface position.

14. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during said times, and autopilot means for at said times causing said servo actuator to actuate said control valve, said servo actuator means comprising a first stage electrically controlled hydraulic bridge, said control means bridging said link disconnect means for producing an output indicating relative control valve displacement to manual control position, and trim means responsive to said control means for resetting said manual means to maintain neutral manual means position during stable control surface position, said trim means being connected to said control link.

15. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during said times, and autopilot means for at said times causing said servo actuator to actuate said control valve, said servo actuator means comprising a first stage electrically controlled hydraulic bridge, said control means bridging said link disconnect means for producing an output indicating relative control valve displacement to manual control position, and trim means responsive to said control means for resetting said manual means to maintain neutral manual means position during stable control surface position, said trim means comprising a timer circuit controlled trim motor.

16. A control system for a space vehicle movable control surface comprising, a power actuator for driving said movable control surface, a control valve for controlling said power actuator, a manual control means, a control link interconnecting said manual control means with said control valve, a disconnect means in said control link for at times disconnecting said manual means from said control valve, servo actuator means connected to said control valve, control means for controlling said servo actuator to actuate said control valve during said times, and autopilot means for at said times causing said servo actuator to actuate said control valve, said servo actuator means comprising a first stage electrically controlled hydraulic bridge, said control means bridging said link disconnect means for producing an output indicating relative control valve displacement to manual control position, and trim means responsive to said control means for resetting said manual means to maintain neutral manual means position during stable control surface position, said trim means being connected to said control link, and a manual control means force measuring device for at said times causing said servo actuator to actuate said control valve, said force measuring device comprising a cantilever spring deflection member and a coil having a variable position core, said core being connected to said cantilever spring deflection member for varying the reluctance of said coil.

References Cited in the file of this patent

UNITED STATES PATENTS

| | | |
|---|---|---|
| 2,733,878 | Ciscel | Feb. 7, 1956 |
| 2,773,660 | Rasmussen | Dec. 11, 1956 |

FOREIGN PATENTS

| | | |
|---|---|---|
| 896,018 | France | Feb. 9, 1945 |